(12) United States Patent
Young et al.

(10) Patent No.: US 12,118,962 B2
(45) Date of Patent: Oct. 15, 2024

(54) SYSTEMS AND METHODS FOR PROCESSING PRE-MULTIPLIED ALPHA CONTENT

(71) Applicant: Apple Inc., Cupertino, CA (US)

(72) Inventors: Vincent Z Young, San Jose, CA (US); Mahesh B Chappalli, San Jose, CA (US); Bartosz Ciechanowski, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 17/983,317

(22) Filed: Nov. 8, 2022

(65) Prior Publication Data

US 2024/0078982 A1  Mar. 7, 2024

Related U.S. Application Data

(60) Provisional application No. 63/404,089, filed on Sep. 6, 2022.

(51) Int. Cl.
    *G09G 5/00* (2006.01)
    *G06T 3/606* (2024.01)
    *G09G 5/28* (2006.01)

(52) U.S. Cl.
    CPC ............ *G09G 5/28* (2013.01); *G06T 3/606* (2013.01); *G09G 2320/0276* (2013.01); *G09G 2320/0285* (2013.01); *G09G 2340/0457* (2013.01)

(58) Field of Classification Search
    None
    See application file for complete search history.

(56) References Cited

U.S. PATENT DOCUMENTS

| 10,187,622 | B1* | 1/2019 | Chappalli | G09G 5/02 |
| 10,474,408 | B2* | 11/2019 | Holland | G09G 5/363 |
| 10,755,392 | B2* | 8/2020 | Chen | H04N 5/202 |
| 2004/0151398 | A1* | 8/2004 | Betrisey | G09G 5/28 |
| | | | | 382/260 |
| 2007/0053423 | A1* | 3/2007 | Uro | G06T 9/20 |
| | | | | 375/240 |
| 2007/0053424 | A1* | 3/2007 | Uro | H04N 9/67 |
| | | | | 375/240 |
| 2008/0094410 | A1* | 4/2008 | Jiao | G06T 15/503 |
| | | | | 345/592 |
| 2009/0167955 | A1* | 7/2009 | Pettitt | H04N 9/67 |
| | | | | 348/E9.037 |
| 2016/0307540 | A1* | 10/2016 | Holland | G09G 5/14 |

OTHER PUBLICATIONS

Pedersen, Soren Sandmann, "Gamma Correction vs. Premultiplied Pixels," published Aug. 2011, ssp.impulsetrain.com/gamma-premult. html, pp. 1-2.

* cited by examiner

*Primary Examiner* — Martin Mushambo
(74) *Attorney, Agent, or Firm* — Fletcher Yoder, P.C.

(57) ABSTRACT

This disclosure is directed toward systems and methods of pre-multiplied alpha handling during image processing operations. The image processing circuitry may include hardware that enables removal and insertion of pre-multiplied alpha content into red, green, blue (RGB) pixel values during gamma and scaling operations. The division by alpha and multiplication by alpha hardware may enable removal of pre-multiplied alpha content to RGB pixel values prior to gamma operations and insertion of pre-multiplied alpha content into RGB pixel values prior to scaling operations.

20 Claims, 7 Drawing Sheets

SYSTEMS AND METHODS FOR PROCESSING PRE-MULTIPLIED ALPHA CONTENT

CROSS-REFERENCE TO RELATED APPLICATIONS

This application claims priority to U.S. Provisional Application No. 63/404,089, entitled "SYSTEMS AND METHODS FOR PROCESSING PRE-MULTIPLIED ALPHA CONTENT," filed Sep. 6, 2022, the disclosure of which is incorporated by reference herein in its entirety for all purposes.

BACKGROUND

This disclosure relates to systems and methods for processing pre-multiplied alpha content. More specifically, systems and methods that enable removal and/or addition of pre-multiplied alpha content to red, green, blue (RGB) pixel values during image processing operations.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—such as cellular devices, televisions, handheld devices, and notebook computers—often display images and videos on an electronic display. To do this, many electronic devices include image processing circuitry to process image data. During image processing, red, green, blue (RGB) pixel values may be processed before being displayed on an electronic display. Some image data may include pre-multiplied alpha content. For example, RGB channels (e.g., RGB pixel values) may include pre-multiplied alpha content for ARGB pixel values. When ARGB pixel values with pre-multiplied alpha content undergo processing, however, undesirable image artifacts may result.

SUMMARY

A summary of certain embodiments disclosed herein is set forth below. It should be understood that these aspects are presented to provide the reader with a brief summary of these certain embodiments and that these aspects are not intended to limit the scope of this disclosure.

Image data received by image processing hardware corresponding to red, green, blue (RGB) channels (e.g., RGB pixel values) may include pre-multiplied alpha content corresponding to ARGB pixel data. The RGB channels that include the pre-multiplied alpha content may undergo one or more image processing operations that include one or more gamma operations. During gamma operations the pre-multiplied alpha content of the RGB channels may be altered by gamma functions that result in different alpha values than the alpha values within the alpha channel that do not undergo gamma operations during image processing. This is because the pre-multiplied alpha values in the RGB channels are linear, and thus should not undergo gamma operations. The gamma operations performed on the RGB pixel values with pre-multiplied alpha content could result in image artifacts including altered image colors resulting from the alpha values undergoing gamma operations unnecessarily, in addition to the RBG values that should undergo gamma operations. Current industry methods for imaging processing may include software and/or additional processing that may be applied during image processing to remove pre-multiplied alpha content from RGB channels during gamma operations (e.g., fixed de-gamma and fixed re-gamma), but this may be costly and result in complicated software operations using system memory and processor resources.

Various systems and methods may reduce or eliminate image artifacts due to image data having pre-multiplied alpha values. These systems and methods may involve removing and/or adding in pre-multiplied alpha content during RGB channel gamma and scaling operations. To do so, embodiments disclosed herein include image processing hardware that enables dividing and/or multiplying alpha channel values into RGB channels prior to and/or following gamma operations and/or scaling operations. The image processing hardware may include hardware that enables dividing and/or multiplying the RGB channels by the alpha channel to remove pre-multiplied alpha content from RGB channels during gamma operations, and add pre-multiplied alpha content during scaling operations subsequent to de-gamma operations. The division by alpha and/or multiplication by alpha hardware may be included in display pipeline hardware and/or memory-to-memory scaler and rotator (MSR) hardware, or any other suitable image processing hardware of the electronic device. The integration of division by alpha and/or multiplication by alpha hardware enables the pre-multiplied alpha content included in the RGB channels to be included during scaling operations and removed during gamma operations. This may reduce image artifacts resulting from gamma operations applied to the pre-multiplied alpha content, particularly when processing images that are of similar colors and when performing composition and/or blending operations.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

This disclosure relates to image processing hardware that enables removal and/or addition of alpha content to red, green, blue (RGB) pixel values (e.g., RGB channels) received by image processing hardware during gamma and scaling operations of the display pipeline and/or memory-to-memory scaler and rotator (MSR) hardware. The image processing hardware may include hardware that enables removal of the pre-multiplied alpha values from the red, green, blue pixel values prior to de-gamma operations and re-gamma operations. The division by alpha and multiplication by alpha hardware enables inclusion of the pre-multiplied alpha content to the RGB pixel values during scaling operations within the image pipeline. The division by alpha hardware may use lookup tables to perform hardware operations to divide out the pre-multiplied alpha content from the RGB pixel values during image processing. Additionally, processing hardware for removing and adding the pre-multiplied alpha content may be included in memory-to-memory scaler and rotator (MSR) hardware to enable removal of pre-multiplied alpha values from RGB pixel values during gamma operations and addition of pre-multiplied alpha values to the RGB pixel values during scaling operations.

Figure 1:
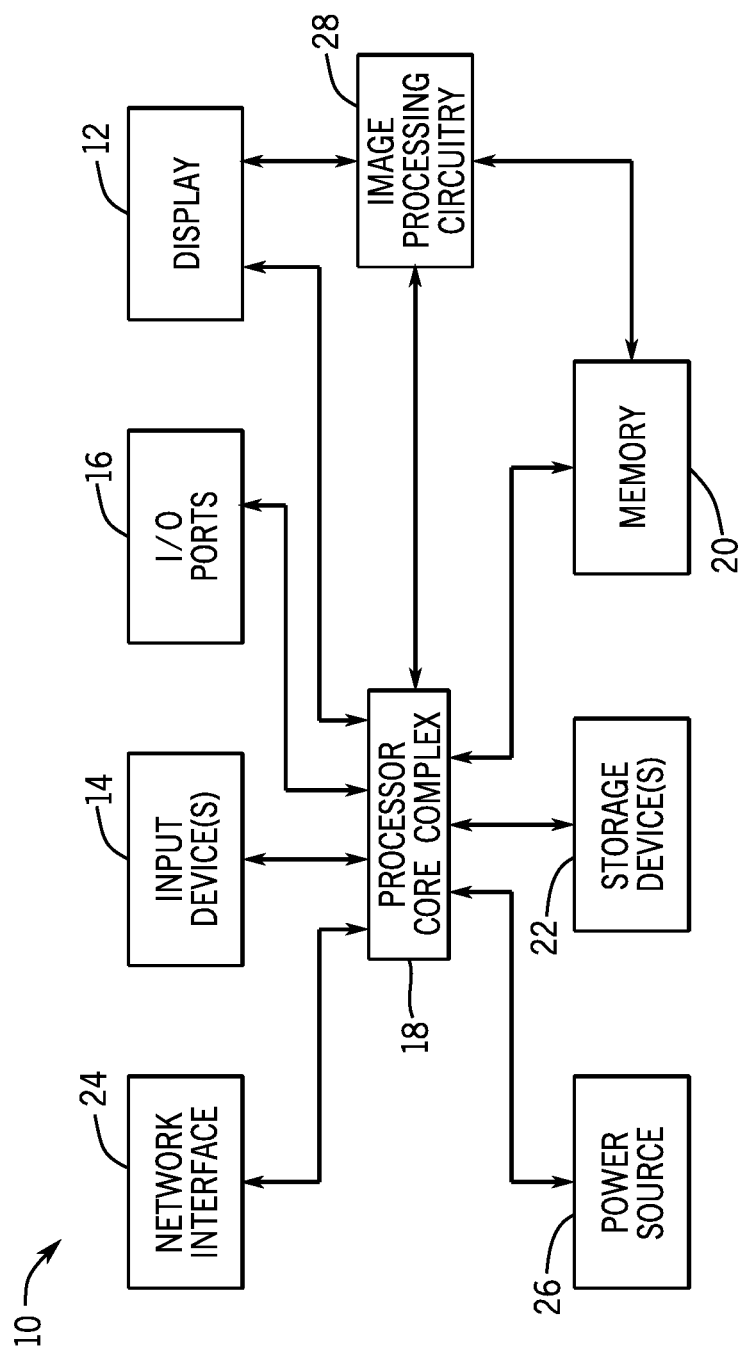
FIG. 1 is a block diagram of an electronic device with an electronic display, in accordance with an embodiment.

Keeping the foregoing in mind, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixels may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in or separate from the processor core complex 18.

The processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable gate arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device. The input device 14 may enable user interaction with the electronic device 10, for example, by receiving user inputs via a button, a keyboard, a mouse, a trackpad, and/or the like. The input device 14 may include touch-sensing components in the electronic display 12. The touch-sensing components may receive user inputs by detecting occurrence and/or position of an object touching the surface of the electronic display 12.

In addition to enabling user inputs, the electronic display 12 may include one or more display panels. Each display panel may be a separate display device or one or more display panels may be combined into a same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

Figure 2:
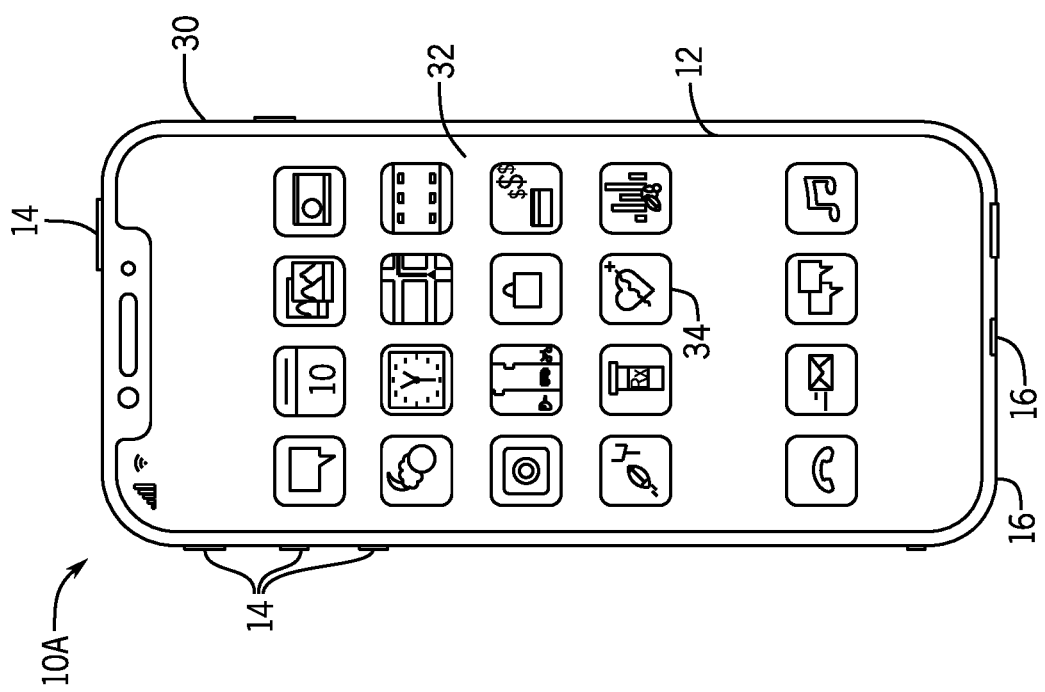
FIG. 2 is an example of the electronic device of FIG. 1, in accordance with an embodiment.

The electronic device 10 may be any suitable electronic device. One example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes.

Figure 3:
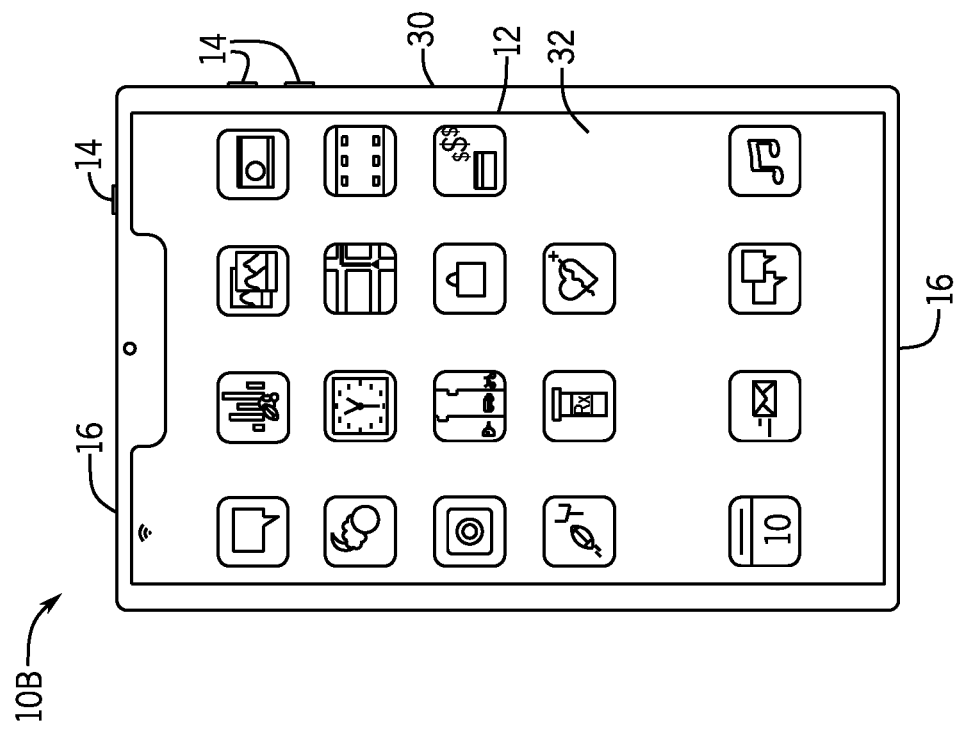
FIG. 3 is another example of the electronic device of FIG. 1, in accordance with an embodiment.
Figure 4:
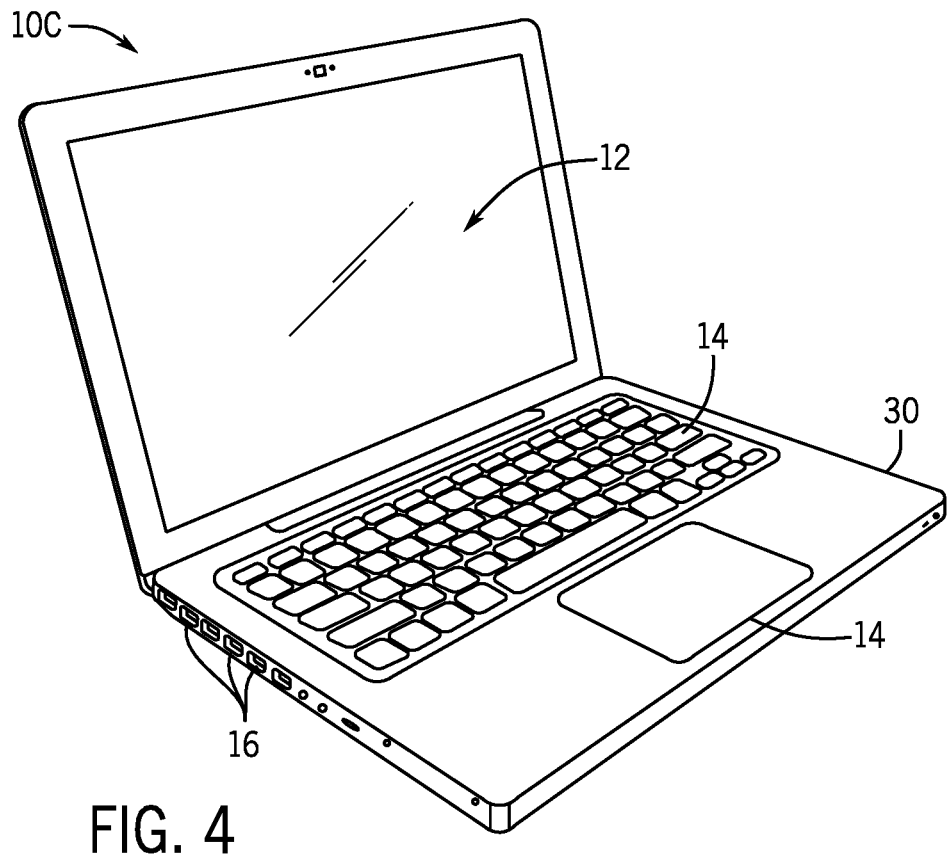
FIG. 4 is another example of the electronic device of FIG. 1, in accordance with an embodiment.
Figure 5:
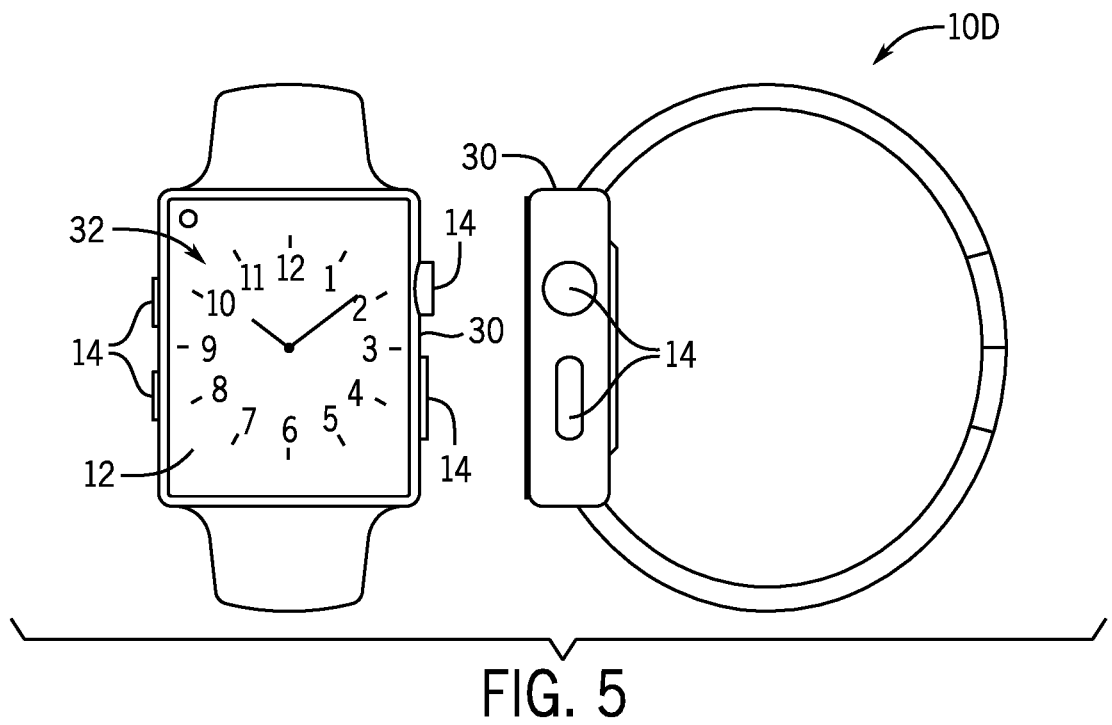
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed with respect to FIGS. 2 and 3.

The electronic device 10 may initially receive encoded image data via image processing circuitry 28 including red, green, blue (RGB) pixel values and alpha values. The alpha values may be used to designate an opacity of each of the pixel values of the image data. The alpha values may contribute to layering within an image, by enabling one or more background layer color pixels to be viewed through one or more top layer color pixels based on the designated image opacity via the pre-multiplied alpha values. By designating, through the use of alpha values, the top layer color pixel values to correspond to some degree of semi-transparency, the background layer color pixels may be viewed through the top layer. Additionally, the alpha values for an image may be set to remove regions of an image and isolate certain portions of images. This may be helpful during augmented reality (AR) image displays and mixed reality (MR) use cases, where one or more images may be layered. Additionally, the RGB values may be pre-multiplied by the alpha values, in which the pre-multiplied alpha values may undergo image processing operations including filtering and blending. The pre-multiplied alpha values may also enable reduction in image artifacts and undergo image processing operations (e.g., scaling) to provide final images with less artifacts to be displayed relative to alpha values that do not undergo scaling and other image processing operations. The image data may include RGB channels (e.g., RGB pixel values for an image), and each RGB channel may be pre-multiplied by the alpha values (e.g., alpha channel) associated with the image to include the pre-multiplied alpha content during image processing operations.

Figure 6:
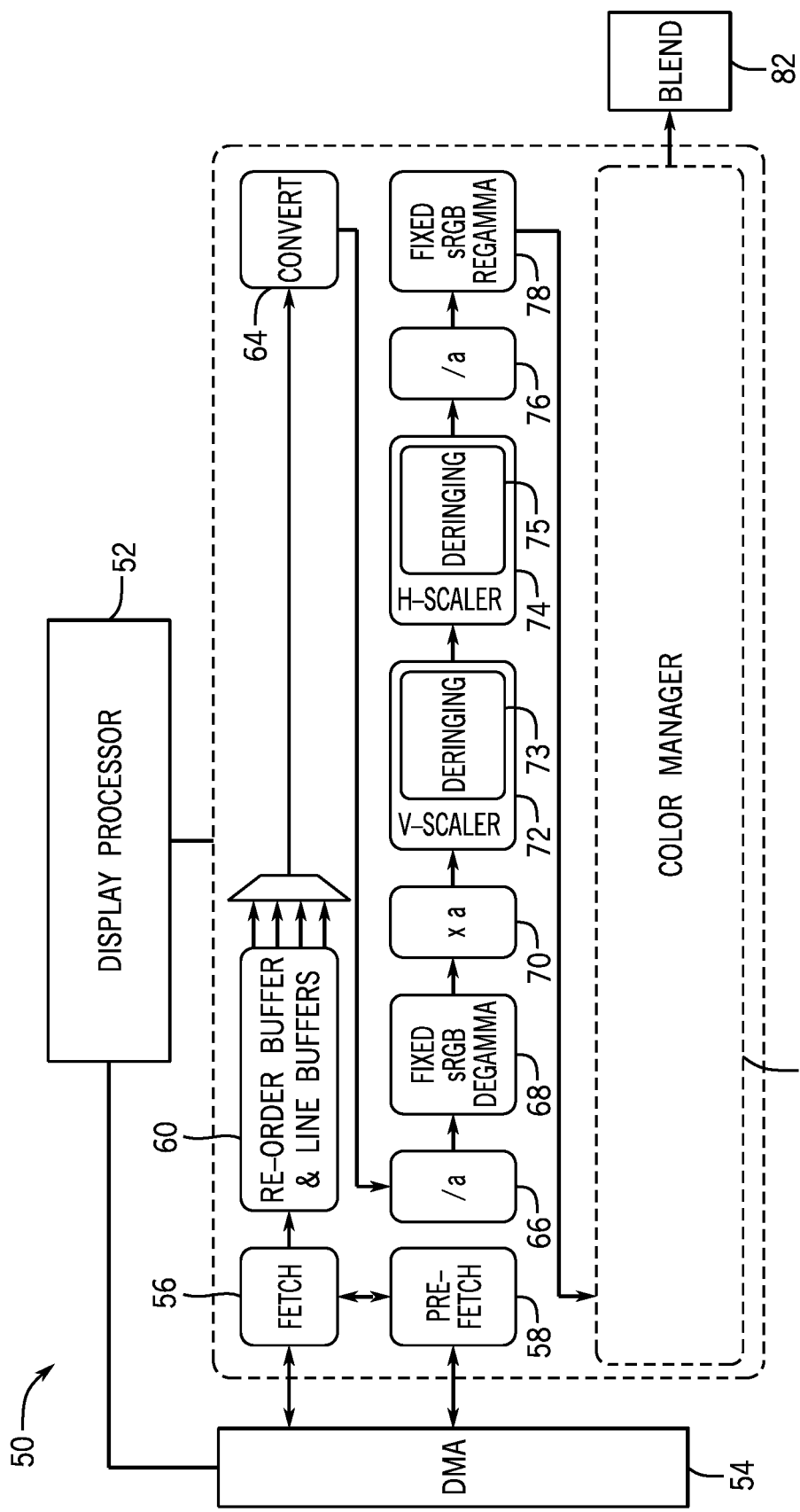
FIG. 6 is a block diagram of a first example of display pipeline hardware components, in accordance with an embodiment.

With the foregoing in mind FIG. 6 is a block diagram of a first example of display pipeline hardware 50 components, in accordance with an embodiment of the present disclosure. The display pipeline hardware 50 may include a display co-processor 52, a direct memory access (DMA) 54, a fetch block 56 and a pre-fetch block 58, a re-order line buffers and line buffers block 60, a convert block 64, a division by alpha block 66, a fixed RGB de-gamma operation block 68, a multiplication by alpha block 70, a vertical scaling block 72, a horizontal scaling block 74, a fixed RGB re-gamma operation block 78, and a color manager block 80. The display pipeline hardware 50 may receive ARGB image content (e.g., RGB channels with pre-multiplied alpha content), and process the image content for display on the electronic device 10.

As discussed above, the display pipeline hardware 50 includes a display co-processor 52 that may include one or more local processors and/or a main processor that may be used to run firmware and/or software operations that enable control (e.g., dynamic control) of display pipeline hardware 50. The display co-processor 52 may be in communication with the direct memory access (DMA) 54. The fetch block 56 and the pre-fetch block 58 may include hardware that enables fetching of image data (e.g., RGB pixel data, ARGB pixel data, YCbCr pixel data) from the DMA 54. The fetch block 56 may include hardware that relies on the pre-fetch block 58 logic to issue commands to the DMA 54 or any memory unit (e.g., streaming memory management unit). The pre-fetch block 58 includes hardware that facilitates fetching image data in advance to cover any latency in image data retrieval. The re-order buffer and line buffer block 60 includes hardware that may receive the image data from the fetch block 56, and reorder the image data as desired. The image data may be streamed from the re-order buffer and line buffer block 60 to the convert block 64.

The convert block 64 includes hardware that may remap all the image data source formats to any suitable format prior to the processing of the received image data (e.g., ARBG content). The convert block 64 may receive image data of the alpha channel and RGB channels with pre-multiplied alpha content. The pre-multiplied alpha content includes alpha values multiplied by the red, green, and blue values for each pixel of the ARGB image data. The alpha values multiplied by the RBG values may be defined as pre-multiplied alpha content. The convert block 64 hardware may limit the programmed offset for the alpha channel to a particular range (e.g., [−1.0, 1.0]) and clamp the alpha values to a particular range (e.g., [0.0, 1.0]), to enable efficient memory usage with regards to processing of alpha values. It should be understood, that any suitable range of alpha values may be implemented corresponding to memory 54 and system constraints. Additionally, the RGB channels with pre-multiplied alpha content may include a programmable offset and multiplier based on the format of the RGB values (e.g., FP16, 6-bit, 7-bit, 8-bit, 10-bit, 12-bit, 16-bit), and the alpha (A) channel may be quantified to a suitable number of bits (e.g., 6 bits, 7 bits, 8 bits, 9 bits, 10 bits, 11 bits, 12 bits, 16-bits). It should be understood that any suitable conversion may be applied to the alpha (A) channel and RGB channel with pre-multiplied alpha content for further image processing operations.

The pre-multiplied alpha content included in the RGB channels may be sent to the first division by alpha block 66 to enable removal of pre-multiplied alpha content from the RGB channels. To enable the fixed de-gamma operations to be performed on non-pre-multiplied alpha content, a division by the alpha channel may be performed on each RGB channel with pre-multiplied alpha content. The display pipeline hardware 50 may implement one or more settings where division by alpha is or is not enabled (e.g., division by alpha may not be enabled for AYCC image source data and/or when blend block 82 operations are bypassed).

The first division by alpha block 66 includes hardware that may be used to approximate a division by the alpha channel for the RGB channels with pre-multiplied alpha. The hardware may multiply each RGB channel that includes the pre-multiplied alpha content with a reciprocal alpha term stored in a lookup table (LUT). The reciprocal multiplication may include converting the alpha value to a restricted range (e.g., $[2^9\text{-}2^{10\text{-}1}]$), from the original alpha range (e.g., $[1\text{-}2^{10\text{-}1}]$), to restrict the range of reciprocals that may be stored in the memory 54, and enable efficient memory usage. The restricted range may be any range that is smaller than the original alpha value range. The reciprocal alpha value may be stored in an equally spaced LUT which may include 512 entries, or any suitable amount of entries corresponding to the restricted range implemented. The LUT may be indexed using the full restricted range of alpha values, to be multiplied by the RGB channel to remove the pre-multiplied alpha content. In some embodiments, to preserve the sign values of the alpha values, the range of the alpha values may mirror the LUT about 0 to use the same LUT for negative alpha value ranges (e.g., $-2^5$ would be mirrored to $2^5$). The range may then be shifted to use the entry for $2^9$, and the sign may be re-applied to the alpha values. It should be understood, although specific ranges are mentioned above any suitable range of alpha values that corresponds to an equally spaced LUT may be implemented.

The fixed RGB de-gamma operation block 68 may receive the RGB channels with the pre-multiplied alpha content removed. The de-gamma function may be applied to the RGB channels to enable linear scaling of the RGB channels, and to prevent generation of image artifacts during image processing operations. After the fixed de-gamma operation is applied to the RGB channels, the alpha channel may be re-multiplied into each RGB channel in the multiplication by alpha block 70. This may enable later scaling operations to be performed based on RGB channels containing pre-multiplied alpha content.

The RGB channels may be represented as s5.24 numbers, or any other suitable signed number format and the alpha channel may be represented as 6-bit, 7-bit, 8-bit, 10-bit, 12-bit, 16-bit, or any suitable bit numbers, or any other signed suitable number format. The output of the alpha channel re-multiplication may be quantized to the corresponding RGB channel precision. It should be understood that any suitable conversion may be applied to the alpha channel (A) and RGB channel with pre-multiplied alpha content for further image processing operations.

After the multiplication by alpha block 70, the RGB channels that include pre-multiplied alpha content are received by the vertical scaling block 72. The vertical scaling block may include hardware that enables the RGB channels with pre-multiplied alpha content to undergo vertical scaling operations. The vertical scaling block includes a first deringing block 73 that may be used to mitigate ringing artifacts by detecting areas with sharp transitions within the image data and blend the original scaler output with linear interpolation scaler output to reduce ringing artifacts. Indeed, the deringing detection of the deriniging block 73 may be more accurate when the detection is done on color values with alpha pre-multiplied (e.g., less deringing strength with less opaque content). The scaled vertical RGB channels with pre-multiplied alpha content are streamed to the horizontal scaling block 74 that includes hardware that enables the vertically scaled RGB channels with pre-multiplied alpha content to undergo horizontal scaling operations. The horizontal scaling block 74, includes a second deringing block 75 that may be used to mitigate ringing artifacts by detecting areas with sharp transitions within the image data and blend the original scaler output with linear interpolation scaler output to reduce ringing artifacts. The alpha channel may be maintained at a 6-bit precision, 7-bit precision, 8-bit precision, 9-bit precision, 10-bit precision, 11-bit precision, 12-bit precision, 16-bit precision, or any suitable precision at the output of the convert block 64 and may retain one or more additional bits of precision between the vertical scaling block 72 and the horizontal scaling block 74. The alpha (A) channel may be quantified to a suitable number of bits (e.g., 6 bits, 7 bits, 8 bits, 9 bits, 10 bits, 11 bits, 12 bits, 16-bits). It should be understood that any suitable conversion may be applied to the alpha channel (A) and RGB channel with pre-multiplied alpha content for further image processing operations.

The horizontal scaling block 74 and the vertical scaling block 72 perform operations that accept input pixels and generate output pixels at a few sets of precisions to account for the color components and the alpha channels in the ARGB source content.

The scaled RGB channels and alpha channel may be received at the second division by alpha block 76 that includes hardware that performs operations to remove pre-multiplied alpha content from RGB channels. To enable the fixed RGB re-gamma operations to be performed on only non pre-multiplied alpha content, a division by the alpha channel may be performed on each RGB channel. The display pipeline hardware 50 may implement one or more settings where division by alpha is enabled, and/or division by alpha is not enabled for AYCC image source data and/or when blend block 82 operations are bypassed.

The second division by alpha block 76 may perform operations similarly to the first division by alpha block 66 by approximating a division by the alpha channel for the RGB channels by multiplying each RGB channel that includes the pre-multiplied alpha content with a reciprocal alpha term stored in a lookup table (LUT). The reciprocal multiplication may include converting the alpha value to a restricted range (e.g., $[2^9\text{-}2^{10\text{-}1}]$) from the original alpha range (e.g., $[1\text{-}2^{10\text{-}1}]$), to restrict the range of reciprocals that may be stored in the memory 54, and enable efficient memory usage. The reciprocal alpha value may be stored in an equally spaced LUT which may include 512 entries, or any suitable number of entries corresponding to the restricted range implemented. The LUT may be indexed using the full restricted range of alpha values, to be multiplied by the RGB channel to remove the pre-multiplied alpha content. In some embodiments, to preserve the sign values of the alpha values, the range of the alpha values may mirror the LUT about 0 to use the same LUT for negative alpha value ranges (e.g., $-2^5$ would be mirrored to $2^5$). The range may then be shifted to use the entry for $2^9$, and the sign may be re-applied to the alpha values. It should be understood, although specific ranges are mentioned above any suitable range of alpha values that corresponds to an equally spaced LUT range may be implemented.

The fixed RGB re-gamma block may receive the RGB channels with the pre-multiplied alpha content removed. The fixed RGB re-gamma block 78 includes hardware that performs operations to reverse the linear scaling operations by applying the re-gamma function to the RGB channels with the pre-multiplied alpha content removed. The re-gamma function may invert the de-gamma function applied to the RGB channels during linear scaling operations. The RGB channels with the pre-multiplied alpha content removed may be received by the color manager block 80 of the display pipeline hardware 50. The color manager block 80 may include one or more of the following multiple sequential hardware components including the color space conversion (CSC) hardware which uses a 3×3 transform to convert the RGB channels into a desired output format, fixed de-gamma operations, tone mapping operations, post-tone mapping operations, de-gamma LUT operations, 3×3 transform operations, range clipping operations, and re-gamma LUT operations. The output of the RGB channels from the color manager block 80 may be streamed to the blend block 82 for further image processing operations. The blend block 82 may also receive indication of whether the input values to the blend block include pre-multiplied alpha content in the RGB channels.

Figure 7:
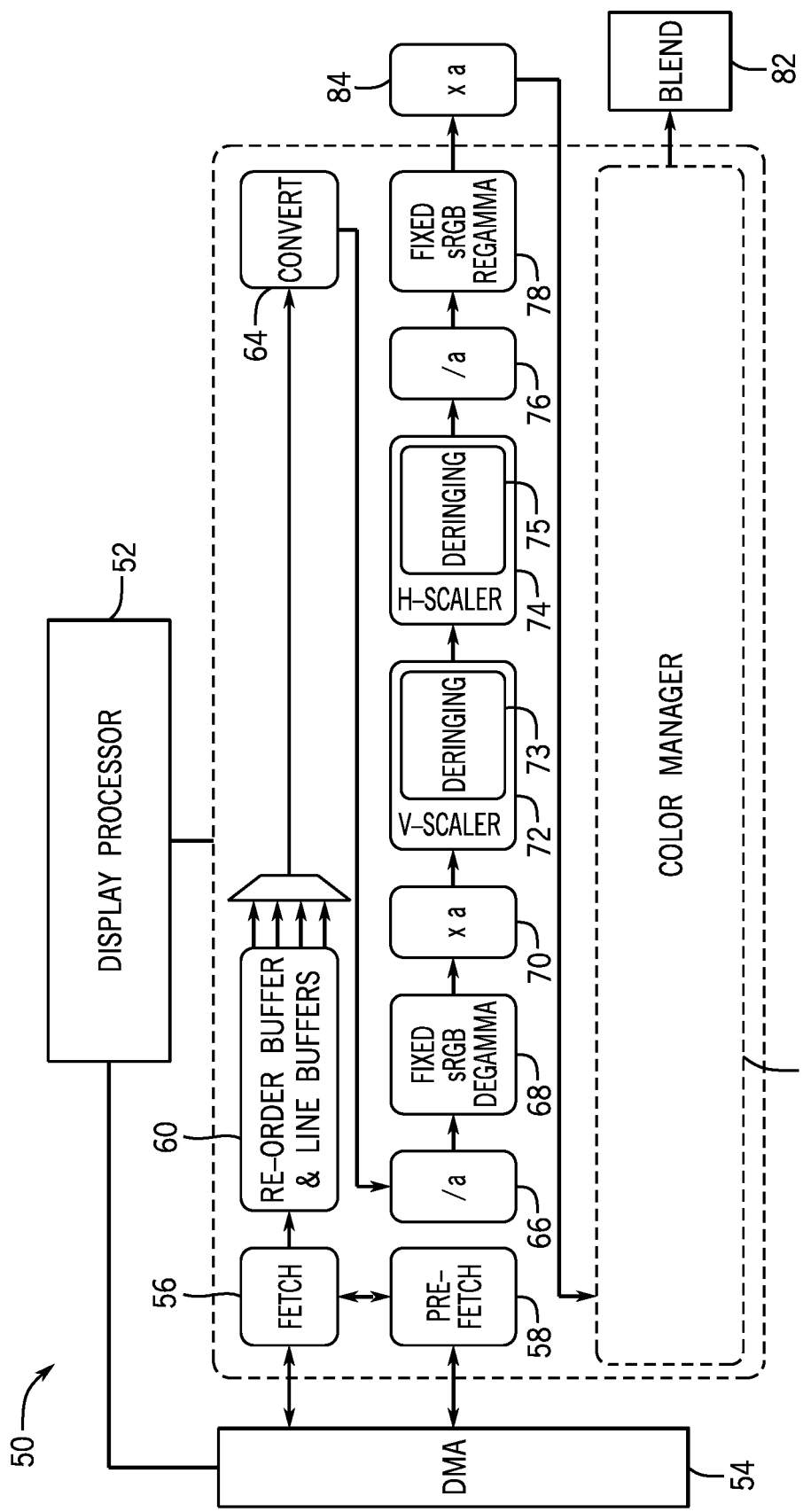
FIG. 7 is a block diagram of a second example of display pipeline hardware components, in accordance with an embodiment.

With the foregoing in mind FIG. 7 is a block diagram of a second example of display pipeline hardware 50, in accordance with an embodiment of the present disclosure. The display pipeline hardware 50 may depict a generic pipe of the display circuitry that includes may include a display co-processor 52, a direct memory access (DMA) 54, a fetch block 56 and a pre-fetch block 58, a re-order line buffers and line buffers block 60, a convert block 64, a division by alpha block 66, a fixed RGB de-gamma operation block 68, a multiplication by alpha block 70, a vertical scaling block 72, a horizontal scaling block 74, a second multiply by alpha block 84, a fixed RGB re-gamma operation block 78, and a color manager block 80. The display pipeline hardware 50 may receive ARGB image content (e.g., RGB channels with pre-multiplied alpha content), and process the image content for display on the electronic device 10.

As discussed above, the display pipeline hardware 50 includes a display co-processor 52 that may include one or more local processors and/or a main processor and/or controller that may be used to run firmware and/or software operations that enable real-time control of display pipeline hardware 50. The display co-processor 52 may be in communication with the direct memory access (DMA) 54. The fetch block 56 and the pre-fetch block 58 may include hardware that enables fetching of image data (e.g., RGB pixel data, ARGB pixel data, YCbCr pixel data) from the DMA 54. The fetch block 56 may include hardware that relies on the pre-fetch block 58 logic to issue commands to the DMA 54, or other memory unit such as a streaming memory management unit. The pre-fetch block 58 includes hardware that facilitates fetching image data in advance to cover any latency in image data retrieval. The re-order buffer and line buffer block 60 includes hardware that may receive the image data from the fetch block 56, and reorder the image data as desired. The image data may be streamed from the re-order buffer and line buffer block 60 to the convert block 64. The convert block 64 includes hardware that may remap all the image data source formats to any suitable format prior to the processing of the received image data (e.g., ARBG content). The convert block 64 may receive image data of the alpha channel and RGB channels with pre-multiplied alpha content corresponding to each of the image pixel values for the received ARGB content. The convert block 64 hardware may limit the programmed offset for the alpha channel to a particular range (e.g., [−1.0, 1.0]) and clamp the alpha to a particular range (e.g., [0.0, 1.0]), to enable efficient memory usage with regards to processing of alpha values. It should be understood, that any suitable range of alpha values may be implemented corresponding to memory 54 and system constraints. Additionally, the RGB channels with pre-multiplied alpha content may include a programmable offset and multiplier based on the format of the RGB values (e.g., FP16, 6-bit, 7-bit, 8-bit, 10-bit, 12-bit, 16-bit), and the alpha (A) channel may be quantified to a suitable number of bits (e.g., 6 bits, 7 bits, 8 bits, 9 bits, 10 bits, 11 bits, 12 bits). It should be understood that any suitable conversion may be applied to the alpha (A) channel and RGB channel with pre-multiplied alpha content for further image processing operations.

The ARGB content included in the alpha channel and RGB channels may be sent to the first division by alpha block 66 to enable removal of pre-multiplied alpha content from the RGB channels. To enable the fixed de-gamma operations to be performed on non-pre-multiplied alpha content a division by the alpha channel may be performed on each RGB channel with pre-multiplied alpha content. The display pipeline hardware 50 may implement one or more settings where division by alpha is enabled, or division by alpha is not enabled for AYCC image source data and/or when blend block 82 operations are bypassed.

The first division block by alpha block 66 includes hardware that may by approximate a division by the alpha channel for the RGB channels with pre-multiplied alpha content by multiplying each RGB channel that includes the pre-multiplied alpha content with a reciprocal alpha term stored in a lookup table (LUT). The reciprocal multiplication may include converting the alpha value to a restricted range (e.g., $[2^9\text{-}2^{10\text{-}1}]$), from the original alpha range (e.g., $[1\text{-}2^{10\text{-}1}]$), to restrict the range of reciprocals that may be stored in the memory 54, and enable efficient memory usage. The restricted range of reciprocals may be any range smaller than the original alpha range. The reciprocal alpha value may be stored in an equally spaced LUT which may include 512 entries, or any suitable amount of entries corresponding to the restricted range implemented. In some embodiments, to preserve the sign values of the alpha values, the range of the alpha values may mirror the LUT about 0 to use the same LUT for negative alpha value ranges (e.g., $-2^5$ would be mirrored to $2^5$). The range may then be shifted to use the entry for $2^9$, and the sign may be re-applied to the alpha values. The LUT may be indexed using the full restricted range of alpha values, to be multiplied by the RGB channel to remove the pre-multiplied alpha content. It should be understood, although specific ranges are mentioned above any suitable range of alpha values that corresponds to an equally spaced LUT range may be implemented.

The fixed RGB de-gamma operation block 68 may receive the RGB channels with the pre-multiplied alpha content removed. The de-gamma function may be applied to the RGB channels to enable linear scaling of the RGB channels. After the fixed de-gamma operation is applied to the RGB channels, the alpha channel may be re-multiplied into each RGB channel in the multiplication by alpha block 70. This may enable later scaling operations to be performed based on RGB channels containing pre-multiplied alpha content.

The RGB channels may be represented as s5.24 numbers, or any other suitable signed number format and the alpha channel may be represented as 6-bit, 7-bit, 8-bit, 10-bit, 12-bit, 16-bit numbers, or any other suitable signed number format. The output of the alpha channel re-multiplication may be quantized to the corresponding RGB channel precision. It should be understood that any suitable conversion may be applied to the alpha channel (A) and RGB channel with pre-multiplied alpha content for further image processing operations.

After the multiplication by alpha block 70, the RGB channels that include pre-multiplied alpha content are received by the vertical scaling block 72. The vertical scaling block may include hardware that enables the RGB channels with pre-multiplied alpha content to undergo vertical scaling operations. The vertical scaling block includes the first deringing block 73 that may be used to mitigate ringing artifacts by detecting areas with sharp transitions within the image data and blend the original scaler output with linear interpolation scaler output to reduce ringing artifacts. The scaled vertical RGB channels with pre-multiplied alpha content are streamed to the horizontal scaling block 74 that includes hardware that enables the vertically scaled RGB channels with pre-multiplied alpha content to undergo horizontal scaling operations. The horizontal scaling block 74, includes the second deringing block 75 that may be used to mitigate ringing artifacts by detecting areas with sharp transitions within the image data and blend the original scaler output with linear interpolation scaler output to reduce ringing artifacts. The alpha channel may be maintained at an 6-bit precision, 7-bit precision, 8-bit precision, 9-bit precision, 10-bit precision, 11-bit precision, 12-bit precision, 16-bit precision, or any suitable precision at the output of the convert block 64 and may retain one or more additional bits of precision between the vertical scaling block 72 and the horizontal scaling block 74. The alpha (A) channel may be quantified to a suitable number of bits (e.g., 6 bits, 7 bits, 8 bits, 9 bits, 10 bits, 11 bits, 12 bits). It should be understood that any suitable conversion may be applied to the alpha channel (A) and RGB channel with pre-multiplied alpha content for further image processing operations.

The scaled RGB channels and alpha channel may be received at the second division by alpha block 76 that includes hardware that performs operations to remove pre-multiplied alpha content from RGB channels. To enable the fixed RGB re-gamma operations to be performed on only non pre-multiplied alpha content a division by the alpha channel may be performed on each RGB channel. It should be understood the display pipeline hardware 50 may implement one or more settings where division by alpha is enabled, and/or division by alpha is not enabled for AYCC image source data and/or when blend block 82 operations are bypassed.

The second division by alpha block 76 may perform operations similarly to the first division by alpha block 66 by approximating a division by the alpha channel for the RGB channels by multiplying each RGB channel that includes the pre-multiplied alpha content with a reciprocal alpha term stored in a lookup table (LUT). The reciprocal multiplication may include converting the alpha values to a restricted range (e.g., $[2^9\text{-}2^{10\text{-}1}]$) from the original range (e.g., $[1\text{-}2^{10\text{-}1}]$) The reciprocal alpha value may be stored in an equally spaced LUT with 512 entries, or any other number of equally spaced entries to correspond to the restricted range to be indexed using the full restricted range of alpha values to multiply by the RGB channels to remove pre-multiplied alpha content prior to gamma operations to enable efficient memory usage with regards to processing of alpha values. In some embodiments, to preserve the sign values of the alpha values, the range of the alpha values may mirror the LUT about 0 to use the same LUT for negative alpha value ranges (e.g., $-2^5$ would be mirrored to $2^5$). The range may then be shifted to use the entry for $2^9$, and the sign may be re-applied to the alpha values. It should be understood, that any suitable range of alpha values may be implemented corresponding to memory and system constraints.

The fixed RGB re-gamma block may receive the RGB channels with the pre-multiplied alpha content removed. The fixed RGB re-gamma block 78 includes hardware that performs operations to reverse the linear scaling operations by applying the re-gamma function to the RGB channels with the pre-multiplied alpha content removed. The re-gamma function may invert the de-gamma function applied to the RGB channels during linear scaling operations.

After the fixed de-gamma operation is applied to the RGB channel, the alpha channel may be re-multiplied into each RGB channel in the second multiplication by alpha block 84. This may enable later scaling operations to be performed based on values containing alpha pre-multiplied content. The second multiplication by alpha block 84 operates using the same methods as the multiplication by alpha block 70.

The RGB channels with the pre-multiplied alpha content added may be received by the color manager block 80 of the display pipeline hardware 50. The color manager block 80 may include one or more of the following multiple sequential hardware components including the color space conversion (CSC) hardware which uses a 3×3 transform to convert the RGB channels into a desired output format, fixed de-gamma operations, tone mapping operations, post-tone mapping operations, de-gamma LUT operations, 3×3 transform operations, range clipping operations, and re-gamma LUT operations. The output of the RGB channels from the color manager block 80 may be streamed to the blend block 82 for further image processing operations. The blend block 82 may also receive indication of whether the input values to the blend block include pre-multiplied alpha content in the RGB channels.

The removal and insertion of pre-multiplied alpha content into the RGB channels and the multiplication by alpha and division by alpha hardware may be implemented in multiple image processing operations of the electronic device 10. For example, the multiplication by alpha and division by alpha hardware may be implemented in memory-to-memory scaler and rotator (MSR) hardware operations. MSR hardware operations may be implemented to convert image data including pixel values into intermediate working precision pixel values through scaling operations of the MSR hardware.

Figure 8:
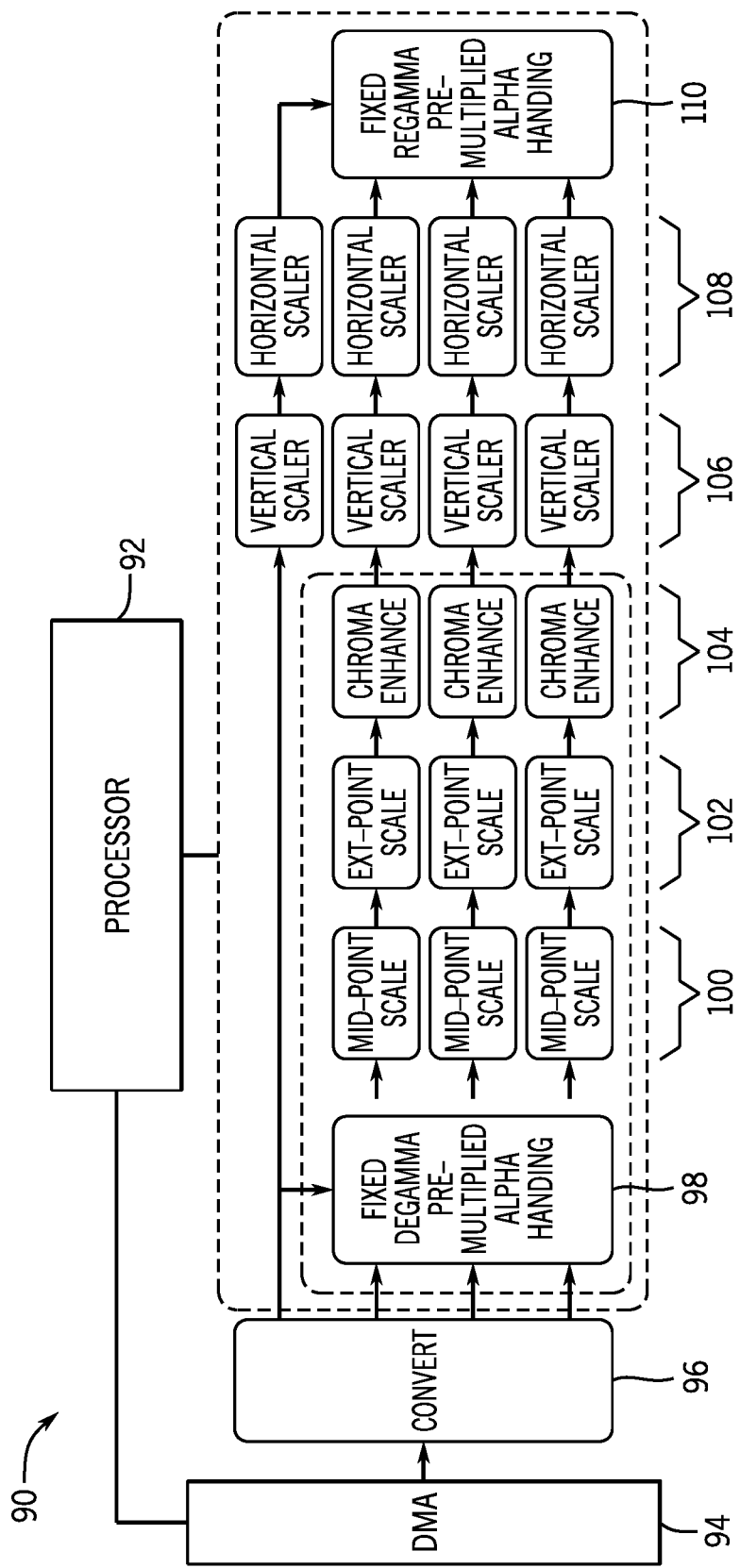
FIG. 8 is a block diagram of memory-to-memory scaler and rotator (MSR) hardware components, in accordance with an embodiment.

Keeping the foregoing in mind, FIG. 8 is a block diagram of memory-to-memory scaler and rotator (MSR) hardware for image processing, in accordance with an embodiment. The MSR hardware 90 may include a MSR convert block 96, a de-gamma operation and pre-multiplied alpha handling block 98, multiple mid-point scaling blocks 100, multiple ext-point scaling blocks 102, multiple chroma enhance blocks 104, an enhance block 105, multiple vertical scaler blocks 106, multiple horizontal scaler blocks 108, and a fixed re-gamma and pre-multiplied alpha handling block 110. The MSR hardware 90 may include directional scaler capabilities and enable scaling of pixel values received by the hardware.

The MSR hardware may include a processor 92 that may be a local co-processor of the MSR hardware and/or a main application processor. The processor 92 may be in communication with a DMA of the MSR hardware 94. The MSR convert block 96 hardware may remap image data (e.g., RGB channels, alpha channel) received from the MSR DMA 94 corresponding to fixed-point source formats and the floating point-16 formats to equivalent values in s7.24 format prior to image processing operations being performed on the image data. The output of the convert block 96 is received by the fixed de-gamma pre-multiplied alpha handling block 98 which includes hardware that receives the RGB channels including the pre-multiplied alpha content and ensures fixed de-gamma operations are only applied to non pre-multiplied alpha content when linear scaling mode is enabled.

To ensure this, each of the RBG channels may be divided by the alpha channel of an alpha pre-multiplied input pixel. The alpha channel may remain unaltered during these division operations. The division by the alpha channel may be approximated through multiplication of an alpha reciprocal term scored in a look-up-table LUT, as discussed above in FIGS. 6 and 7. The alpha channel values may be reduced from 16-bits to 10-bits to reduce complexity for the division calculations. The reciprocal multiplication may include converting the alpha values to a restricted range from the original range of alpha values. The reciprocal alpha value may be stored in an equally spaced LUT with 512 entries, or any suitable number of entries corresponding to the restricted range, to be indexed using the full restricted range of alpha values to multiply by the RGB channels to remove pre-multiplied alpha content prior to gamma operations to enable efficient memory usage with regards to processing of alpha values. It should be understood, that any suitable range of alpha values may be implemented corresponding to memory and system constraints.

The de-gamma function operations may include linear scaling of the RGB channels. After the fixed de-gamma operation is applied to the RGB channels, the alpha channel may be re-multiplied into each RGB channel. This may enable later scaling operations to be performed based on values containing alpha pre-multiplied content. The output of the fixed de-gamma operations may undergo re-multiplication by the alpha channel. The alpha channel may be re-multiplied into each RGB channel to enable scaling operations to be performed on pre-multiplied alpha content. The RGB channels (e.g., color channels) may include RGB pixel values that may be represented as s7.24 numbers or any suitable signed number format, and the alpha channel, as discussed above, may be represented as u0.10 numbers, or any other suitable signed number format. In some embodiments, the alpha value may be represented as u0.16 during pre-vertical scaler and post-horizontal scaler operations. Additionally, the alpha value may correspond to the signed number format of u0.21 between the vertical and horizontal scaling operations. The output of the alpha channel re-multiplication may be quantized to the precision of the color channels. The alpha values may be modified from FP16, 6-bit, 7-bit, 8-bit, 10-bit, 12-bit, 16-bit values or any other original bit value to a restricted bit value (e.g., FP16, 6-bit, 7-bit, 8-bit, 10-bit, 12-bit, 16-bit), less than the original alpha bit value. The output of the alpha channel re-multiplication may be quantized to the corresponding RGB channel precision. It should be understood that any suitable conversion may be applied to the alpha channel (A) and RGB channel with pre-multiplied alpha content for further image processing operations. After the conversion of the alpha values is performed, a programmable offset may be added to clip the alpha range.

The output of the re-multiplication of alpha by each of the RGB channels may be streamed to mid-point scale blocks 100 to begin scaler operations for each RGB channel. Each of the RGB channels may be received at a respective mid-point scale block 100. The mid-point scale block may perform a two-times interpolation by interpolating the mid-point of every 2×2 pixel, or any other suitable number set of pixels, followed by interpolation of the exterior points at the ext-point scale blocks 102. Each of the chroma enhancement block 104 and the enhance block 105 receives the interpolated pixel values from each of the ext-point scale blocks, and performs enhancement to enhance image edges that may have been blurred during the directional scaling. The output of each chroma enhancement block 104 and the enhance block 105 may then be streamed into each of the vertical scaler blocks 106 along with the alpha channel. Each of the vertical scaler blocks 106 may include three filters and may use a first filter to scale RGB components and use another filter to scale the alpha components. The output of the vertical scaler blocks may be sent to the horizontal scaler blocks 108. Like the vertical scaler blocks 106, the horizontal scaler blocks 108 may include three filters and may use a first filter to scale RGB components and use another filter to scale the alpha components.

The output of each of the horizontal scaler blocks 108 corresponding to each RGB channel and alpha channel may be sent to the fixed re-gamma, pre-multiplied alpha handling block 110 that includes hardware to remove the pre-multiplied alpha content from each of the RGB channels prior to re-gamma operations. A division by the alpha channel may be performed for each RGB channel by approximating a division by alpha by multiplying each RGB channel that includes the pre-multiplied alpha content with a reciprocal term stored in a lookup table (LUT). The reciprocal multiplication may include converting the alpha values to a restricted range from the original range. The reciprocal alpha value may be stored in an equally spaced LUT with 512 entries, or any suitable number of entries to correspond to the restricted range, to be indexed using the full restricted range of alpha values to multiply by the RGB channels to remove pre-multiplied alpha content prior to gamma operations to enable efficient memory usage with regards to processing of alpha values. It should be understood, that any suitable range of alpha values may be implemented corresponding to memory and system constraints.

The fixed re-gamma operation may be applied to the RGB channels with no pre-multiplied alpha content to reverse the linear scaling operations by applying the re-gamma function to the RGB channels with the pre-multiplied alpha values removed. The re-gamma function may invert the de-gamma function applied to the values during linear scaling operations. After the fixed re-gamma operation is applied to the each of the RGB channels, the alpha channel may be re-multiplied into each color channel. This may enable later scaling operations to be performed based on values containing alpha pre-multiplied content. It should be understood that the hardware components used in the fixed de-gamma pre-multiplied alpha handling block 98 and/or the fixed re-gamma pre-multiplied alpha handling block 110, may be implemented in any configuration with components added or removed in certain embodiments.

Figure 9:
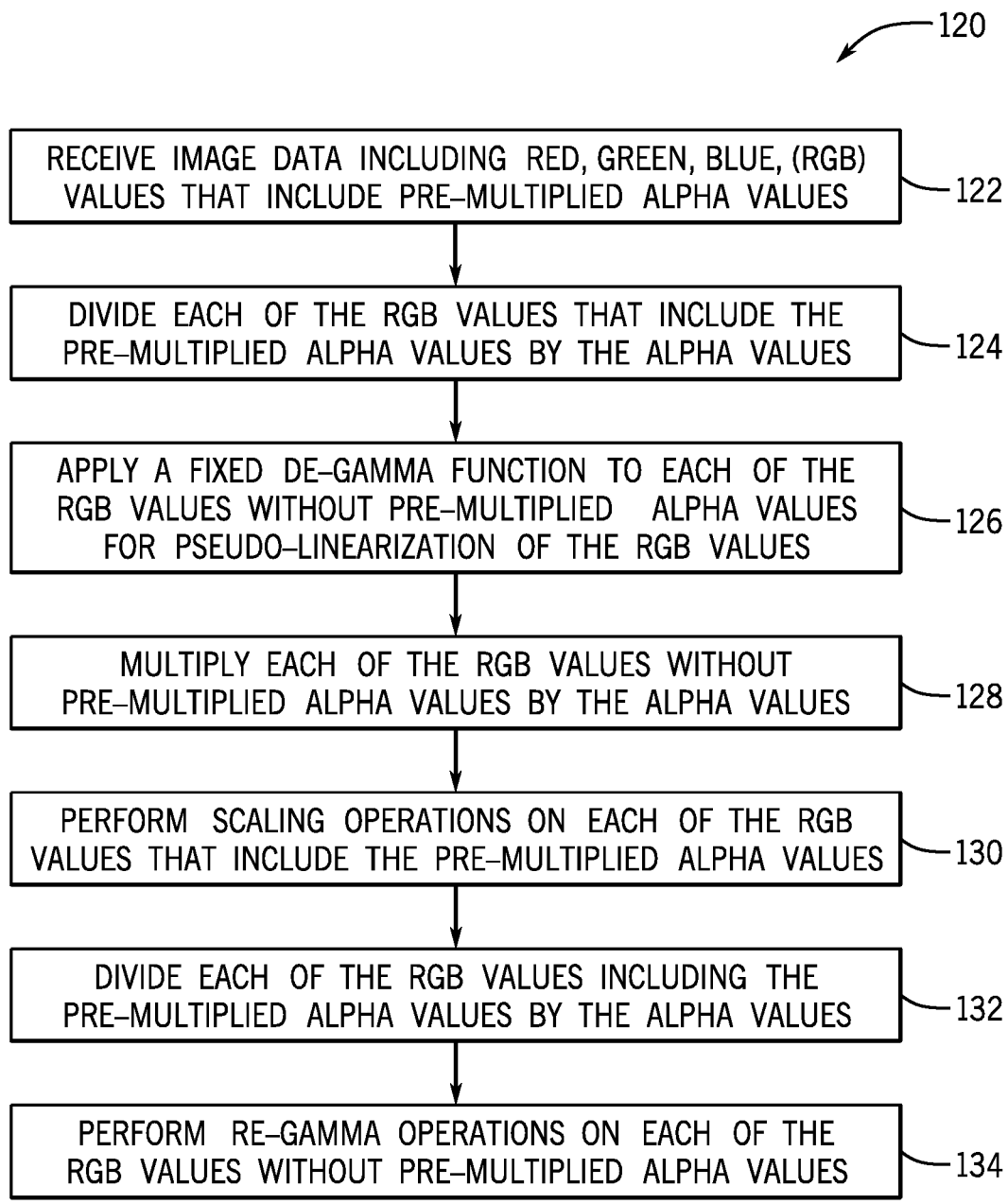
FIG. 9 is a flow diagram of a method for image processing of pre-multiplied alpha content, in accordance with an embodiment.

Keeping the foregoing in mind, FIG. 9 is a flow diagram of a method 120 for processing of pre-multiplied alpha content, in accordance with an embodiment. As discussed above, division by alpha and multiplication by alpha hardware may function to add or remove pre-multiplied alpha content from RGB channels during scaling and gamma operations of the display pipeline hardware 50. It should be understood, that in other embodiments similar division by alpha and/or multiplication by alpha hardware may be implemented in MSR hardware 90 to add or remove pre-multiplied alpha content from RGB channels during scaling and gamma operations of the MSR hardware 90.

The display pipeline hardware 50 may receive image content (e.g., ARGB image content) from the DMA 54. The display pipeline hardware 50 may include division by alpha and multiplication by alpha hardware. Any suitable device that may control components of the electronic device 10, such as the processor core complex 18 (e.g., a processor of the processor core complex 18, a display co-processor 52), may perform the method 120. In some embodiments, the method 120 may be implemented by executing instructions stored in a tangible, non-transitory, computer-readable medium, such as the memory (e.g., DMA 54), using the processor core complex 18 and/or using the display co-processor 52 of the display pipeline hardware 50. For example, the method 120 may be performed at least in part by one or more software components, such as an operating system of the electronic device 10, one or more software applications of the electronic device 10, and the like. While the method 120 is described using steps in a specific sequence, it should be understood that the present disclosure contemplates that the described steps may be performed in different sequences than the sequence illustrated, and certain described steps may be skipped or not performed altogether.

The display pipeline hardware 50, at block 122, receives image content including RGB pixel values (e.g., RGB channels) with pre-multiplied alpha content and alpha pixel values (e.g., alpha channel). The display pipeline hardware 50, at block 124, divides the RGB pixel values that include pre-multiplied alpha content by the alpha pixel value prior to de-gamma operations. The division may include multiplying each of the RGB pixel values with pre-multiplied alpha content by a reciprocal of the alpha pixel value. The reciprocal may be determined based on a reciprocal term stored in a lookup table (LUT). The reciprocal multiplication may include converting the alpha pixel values to a restricted range from the original range. It should be understood that the original range and the restricted range may correspond to any suitable range where the restricted range is less than the original range. The reciprocal alpha pixel value may be stored in an equally spaced LUT with the number of entries corresponding to the restricted range to be indexed using the full restricted range of alpha pixel values.

The display pipeline hardware 50, at block 126, applies a fixed de-gamma function to the RBG pixel values with the removed pre-multiplied alpha content. The fixed de-gamma function may be applied to the RGB color channel values to enable linear scaling of the RGB color channel values. After the fixed de-gamma operation is applied to the RGB pixel values the display pipeline hardware 50, at block 128, re-multiplies the pre-multiplied alpha content into each RGB pixel value. This may enable later scaling operations to be performed based on RGB pixel values containing alpha pre-multiplied content.

After the multiplication by alpha operations, the display pipeline hardware 50, at block 130, performs scaling operations on the RGB pixel values and alpha pixel values that include the pre-multiplied alpha content. The scaling operations may include vertical scaling, horizontal scaling, directional scaling operations, and any other suitable scaling operations.

The display pipeline hardware 50, at block 132, divides the RGB pixel values by the alpha pixel value. To do this, the as discussion above, the display pipeline hardware 50 may approximate a division by alpha pixel values for each of the RGB pixel values by multiplying each RGB pixel value that includes the pre-multiplied alpha content with a reciprocal term stored in a lookup table (LUT). The reciprocal multiplication may include converting the alpha values to a restricted range from the original range. It should be understood that the original range and the restricted range may correspond to any suitable range where the restricted range is smaller than the original range. The reciprocal alpha pixel value may be stored in an equally spaced LUT with the number of entries corresponding to the restricted range to be indexed using the full restricted range of alpha pixel values.

The display pipeline hardware 50, at block 134, performs re-gamma operations. That may enable reversal of the linear scaling operations by applying the re-gamma function to the RGB pixel values with the pre-multiplied alpha content removed. The re-gamma function may invert the de-gamma function applied to the values during linear scaling operations. It should be understood that although implementation in a display pipeline is described above, this method of pre-multiplied alpha removal and addition may be applied to any image processing hardware and/or electronic device 10 processing methods.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
   an electronic display configured to display an image based at least in part on processed image data; and
   image processing circuitry configured to:
      receive a plurality of sub-pixel values comprising red, green, blue (RGB) pixel values that are pre-multiplied by an alpha pixel value;
      divide each of the RGB pixel values of the plurality of sub-pixel values by the alpha pixel value to remove the pre-multiplied alpha pixel value; and
      apply a fixed de-gamma function to each of the RGB pixel values with the pre-multiplied alpha pixel value removed.

2. The electronic device of claim 1, wherein the image processing circuitry is configured to:
   multiply each of the RGB pixel values of the plurality of sub-pixel values by the alpha pixel value; and
   perform scaling operations on each of the RGB pixel values that are pre-multiplied by the alpha pixel value.

3. The electronic device of claim 2, wherein an output of the multiplication of the RGB pixel values of the plurality of sub-pixel values by the alpha pixel value is quantized to a precision of the RGB pixel values.

4. The electronic device of claim 2, wherein the image processing circuitry is configured to:
   divide each of the RGB pixel values of the plurality of sub-pixel values by the alpha pixel value to remove the pre-multiplied alpha pixel value; and
   apply a fixed re-gamma function to each of the RGB pixel values with the pre-multiplied alpha pixel value removed.

5. The electronic device of claim 1, wherein dividing each of the RGB pixel values of the plurality of sub-pixel values by the alpha pixel value to remove the pre-multiplied alpha pixel value comprises using a look-up-table (LUT) to multiply the RGB pixel values by a reciprocal alpha value.

6. The electronic device of claim 5, wherein the LUT comprises equally-spaced entries corresponding to an alpha bit value of the alpha pixel value.

7. An electronic device comprising:
   an electronic display configured to display an image based at least in part on processed image data; and
   image processing circuitry configured to:
      receive a plurality of sub-pixel values comprising pixel values that include are pre-multiplied by an alpha pixel value;
      divide each of the pixel values of the plurality of sub-pixel values by the alpha pixel value to remove the pre-multiplied alpha pixel value; and
      apply one or more image processing operations to each of the pixel values of the plurality of sub-pixel values with the pre-multiplied alpha pixel value removed.

8. The electronic device of claim 7, wherein dividing each pixel value of the plurality of sub-pixel values comprises performing a bit shifting operation on each pixel value of the plurality of sub-pixel values that include the pre-multiplied alpha value.

9. The electronic device of claim 7, wherein the one or more image processing operations comprise fixed de-gamma operations.

10. The electronic device of claim 7, wherein dividing each pixel value of the plurality of sub-pixel values by the alpha pixel value to remove the pre-multiplied alpha pixel value comprises using a look-up-table (LUT) to multiply each pixel value of the plurality of sub-pixel values by a reciprocal alpha value.

11. The electronic device of claim 7, wherein an output of the multiplication of each pixel value of the plurality of sub-pixel values by the alpha pixel value is quantized to a precision of the plurality of sub-pixel values.

12. The electronic device of claim 11, wherein the image processing circuitry is configured to:
   divide each of the pixel values of the plurality of sub-pixel values by the alpha pixel value to remove the pre-multiplied alpha pixel value; and
   apply a fixed re-gamma function to each of the pixel values of the plurality of sub-pixel values with the pre-multiplied alpha pixel value removed.

13. The electronic device of claim 7, wherein the plurality of sub-pixel values comprise RGB pixel values, YCC pixel values, CMY pixel values, or any combination thereof.

14. An electronic device comprising:
   an electronic display configured to display an image based at least in part on processed image data; and
   memory-to-memory scaler and rotator (MSR) circuitry configured to:
      receive a plurality of sub-pixel values comprising red, green, blue (RGB) pixel values that include a pre-multiplied alpha pixel value;
      divide each of the RGB pixel values of the plurality of sub-pixel values by an alpha pixel value to remove the pre-multiplied alpha pixel value; and
      apply a fixed de-gamma function to each of the RGB pixel values with the pre-multiplied alpha pixel value removed.

15. The electronic device of claim 14, wherein the MSR circuitry is configured to:
   multiply each of the RGB pixel values of the plurality of sub-pixel values by the alpha pixel value; and
   perform scaling operations on each of the RGB pixel values that include the pre-multiplied alpha pixel value.

16. The electronic device of claim 15, wherein an output of the multiplication of the RGB pixel values of the plurality of sub-pixel values by the alpha pixel value is quantized to a precision of the RGB pixel values.

17. The electronic device of claim 14, wherein dividing each of the pixel values
   comprises performing a bit shifting operation on the plurality of sub-pixel values that include the pre-multiplied alpha pixel value.

18. The electronic device of claim 14, wherein dividing each of the RGB pixel values of the plurality of sub-pixel values by the alpha pixel value to remove the pre-multiplied alpha pixel value comprises using a look-up-table (LUT) to multiply the pixel values by a reciprocal alpha value.

19. The electronic device of claim 18, wherein the LUT comprises equally-spaced entries corresponding to the alpha pixel value.

20. The electronic device of claim 14, wherein the MSR circuitry is configured to:
   divide each of the RGB pixel values of the plurality of sub-pixel values by the alpha pixel value to remove the pre-multiplied alpha pixel value; and apply a fixed re-gamma function to each of the RGB pixel values with the pre-multiplied alpha pixel value removed.

* * * * *